(12) United States Patent
Guarda et al.

(10) Patent No.: US 7,186,787 B2
(45) Date of Patent: Mar. 6, 2007

(54) LINEAR PERFLUOROPOLYETHERS HAVING AN IMPROVED THERMOOXIDATIVE STABILITY

(75) Inventors: Pier Antonio Guarda, Milan (IT); Giuseppe Marchionni, Milan (IT)

(73) Assignee: Solvay Solexis, S.p.A., Milan (IT)

( * ) Notice: Subject to any disclaimer, the term of this patent is extended or adjusted under 35 U.S.C. 154(b) by 290 days.

(21) Appl. No.: 10/785,006

(22) Filed: Feb. 25, 2004

(65) Prior Publication Data

US 2004/0176555 A1 Sep. 9, 2004

(30) Foreign Application Priority Data

Mar. 3, 2003 (IT) .......................... MI2003A0372

(51) Int. Cl.
*C08F 16/24* (2006.01)
(52) U.S. Cl. ...................... 526/247; 508/250; 428/421; 525/387
(58) Field of Classification Search ................. 508/250; 525/387; 428/421; 526/247
See application file for complete search history.

(56) References Cited

U.S. PATENT DOCUMENTS

| 3,715,378 A | 2/1973 | Sianesi et al. |
| 3,810,874 A | 5/1974 | Mitsch et al. |
| 4,664,766 A | 5/1987 | Marchionni et al. |
| 4,746,575 A * | 5/1988 | Scarati et al. ............. 428/835.8 |
| 5,663,127 A * | 9/1997 | Flynn et al. ................. 508/250 |
| 5,744,651 A | 4/1998 | Marchionni et al. |
| 6,509,509 B2 * | 1/2003 | Tonelli et al. .............. 568/606 |

FOREIGN PATENT DOCUMENTS

| EP | 0 435 062 A1 | 7/1991 |
| EP | 694602 A2 * | 1/1996 |
| EP | 0 790 269 A2 | 8/1997 |
| EP | 1454938 * | 2/2004 |
| WO | WO 02/06375 A2 | 1/2002 |

* cited by examiner

*Primary Examiner*—David W. Wu
*Assistant Examiner*—Henry S. Hu
(74) *Attorney, Agent, or Firm*—Arent Fox PLLC

(57) ABSTRACT

Linear perfluoropolyethers of formula:

$$T-O(CF_2O)_n(CF_2CF_2O)_m(CF_2CF_2CF_2O)_r(CF_2CF_2CF_2CF_2O)_s-T_1 \quad (I)$$

wherein n, m, r, s are integers such that the polymer number average molecular weight is comprised between 700 and 100,000 and the n/(n+m+r+s) ratio ranges from 0.05 to 0.40, and respective preparation process by addition of a peroxidic perfluoropolyether of formula (III):

$$T_4-O(CF_2O)_n(CF_2CF_2O)_m(O)_h-T_5 \quad (III)$$

having a PO from 1.8 to 4, to a perfluoropolyether oil preheated at a temperature comprised between 150° C. and 250° C. and subsequent exhaustive fluorination of the obtained compound.

2 Claims, No Drawings

LINEAR PERFLUOROPOLYETHERS HAVING AN IMPROVED THERMOOXIDATIVE STABILITY

The present invention relates to perfluoropolyether oils (PFPE) having a high thermooxidative stability in the presence of metals, and the preparation thereof.

Specifically the invention perfluoropolyethers have a high thermooxidative stability combined with a high viscosity index and with a low pour point value.

More specifically the invention perfluoropolyethers comprise substantially —$C_2F_4O$—, —$CF_2O$— units.

Perfluoropolyether oils obtaind by oxidative polymerization of perfluoroolefins are known and marketed.

In particular perfluoropolyethers are known having formula:

$$R_fO(C_2F_4O)_p(CF_2O)_qR_f' \quad (A)$$

with $R_f$ and $R_f'$ equal to or different from each other selected from $CF_3$—, $C_2F_5$—, $ClCF_2$—, $ClCF_2CF_2$—; p and q are integers, p+q gives the number average molecular weight and p/q ratio ranges from 0.1 to 10. The perfluoroethylenoxide —$CF_2CF_2O$— and perfluoromethylenoxide —$CF_2O$— units are statistically distributed along the polymeric backbone. These perfluoropolyethers are marketed by the Applicant as Fomblin® Z.

They are obtained by oxidative polymerization of tetrafluoroethylene, see for example U.S. Pat. No. 3,715,378 and U.S. Pat. No. 5,744,651, subsequent thermal treatment and exaustive fluorination of the end groups, see for example U.S. Pat. No. 4,664,766.

The formula (A) perfluoropolyethers have a good combination of properties, in particular a high viscosity index (V.I.), higher than 240, generally comprised between 250 and 360, a high thermal stability and a pour point lower than −50° C., generally comprised between −60 and −90° C. The combination of said properties makes the formula (A) perfluoropolyethers suitable as lubricants in a wide temperature range, in particular also at low temperatures.

However their thermooxidative stability in the presence of metals is not very high. For this reason perfluoropolyether oils decompose when one operates at temperatures higher than 200° C. Therefore said oils have a more limited use, they generally require additives to operate at high temperatures (see the comparative Examples).

The need was therefore felt to have available pefluoropolyether oils like those of formula (A) (Fomblin® Z type) but having an improved thermooxidative stability in the presence of metals, substantially maintaining the combination of the Theological properties of said oils of formula (A) as the high viscosity index and the low pour point.

Perfluoropolyethers satisfying the above technical problem have been surprisingly and unexpectedly found.

An object of the present invention are perfluoropolyethers having the following formula:

$$T\text{-}O(CF_2O)_n(CF_2CF_2O)_m(CF_2CF_2CF_2O)_r \\ (CF_2CF_2CF_2CF_2O)_s\text{-}T_1 \quad (I)$$

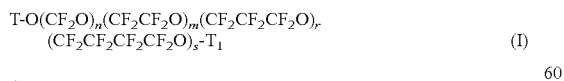

wherein:

T and $T_1$, equal to or different from each other are selected from $CF_3$—, $CF_3CF_2$—, $C_3F_7$—, $C_4F_9$—, $ClCF_2$—, $ClCF_2CF_2$—;

n, m, r, s are integers such that the number average molecular weight is comprised between 700 and 100,000, preferably between 1,500 and 20,000;

the m/n ratio is comprised between 2 and 20, preferably between 2 and 10;

the (r+s)/(n+m+r+s) ratio is comprised between 0.05 and 0.2, preferably between 0.07 and 0.2;

the n/(n+m+r+s) ratio ranges from 0.05 to 0.40, preferably from 0.1 to 0.3;

the perfluorooxyalkylene units being statistically distributed along the polymeric backbone.

The invention compounds are utilized in the lubrication field, in particular they have the same uses of the formula (A) commercial compounds (Fomblin® Z) but they show a higher thermooxidative stability in the presence of metals. In particular the formula (I) compounds having a number average molecular weight in the range 1,500–20,000 (viscosity between 10 cSt and 1,000 cSt at 20° C.), are used as lubricant oils showing a high thermooxidative stability.

The invention perfluoropolyether oils, with respect to the known perfluoropolyether oils having a comparable viscosity, show an increase of thermooxidative stability in the presence of metals of about 30° C. or higher.

The stability of the formula (I) compounds when used as lubricants can be further increased by the addition of thermal stabilizers of perfluoropolyethers. For example, perfluoropolyethers comprising the following groups: phosphines, phosphates, phosphazenes, benzothiazoles, triazines, amines, substituted amines type, nitroderivative compounds, can be mentioned.

Furthermore the formula (I) invention compounds, besides being characterized by a high thermooxidative stability, also show a high viscosity index (V.I.), generally higher than 250, preferably higher than 290, combined with a pour point value lower than −50° C., preferably lower than −60° C. This combination of properties allows the use of the invention compounds as lubricants in a wide range of temperatures, even at low temperatures.

Tests carried out by the Applicant have shown that compounds having the same structure of formula (I) invention compounds but with values of at least one of the above indicated ratios, outside the claimed ranges, characterizing the formula (I) compounds, do not show the property combination of the invention compounds, in particular the thermooxidative stability in the presence of metals.

A further object of the present invention are linear perfluoropolyethers having the following formula:

$$T_2\text{-}O(CF_2O)_n(CF_2CF_2O)_m(CF_2CF_2CF_2O)_r \\ (CF_2CF_2CF_2CF_2O)_s\text{-}T_3 \quad (II)$$

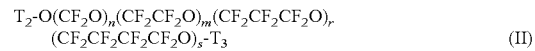

wherein:

$T_2$, $T_3$, equal to or different from each other are selected from —$(CF_2)_z$COF wherein z=0, 1, 2, 3, $CF_3$—, $CF_3CF_2$—, $C_3F_7$—, $C_4F_9$—, $ClCF_2$—, $ClCF_2CF_2$—, wherein the total moles of the end groups comprise from 0.5% by moles to 50% by moles of —COF groups;

n, m, r, s are integers such that the polymer number average molecular weight is in the range 700–100,000, preferably 1,500–20,000;

the m/n ratio is comprised between 2 and 20, preferably between 2 and 10;

the (r+s)/(n+m+r+s) ratio is comprised between 0.05 and 0.2, preferably between 0.07 and 0.2;

the n/(n+m+r+s) ratio ranges from 0.05 to 0.4, preferably from 0.1 to 0.3;

wherein the perfluorooxyalkylene units are statistically distributed along the polymeric backbone.

By exhaustive fluorination of the formula (II) compounds it is possible to obtain the formula (I) compounds.

The —COF containing compounds of formula (II) can be used to confer oil- and hydrorepellence to various materials, for example stone materials.

Besides, said compounds containing —COF end groups can be transformed into other compounds with other functional end groups, for example —COOH by hydrolysis, or —COOR (with R=$CH_3$, $C_2H_5$, $C_3H_7$) by hydrolysis in hydroalcoholic medium. The latter compounds can be transformed into other products having other functional end groups: for example aminic, alcoholic, aldehydic, salts, nitrilic, amidic type. See for example U.S. Pat. No. 3,810, 874. These compounds are used in the surface treatment of various substrata to confer thereto properties as for example hydro- and oil-repellence or reduction of the friction coefficient, or they can be used as comonomers for obtaining block polymers as for example polyesters, polyurethanes or polyamides for the use at low temperatures, etc.

The preparation process of the compounds of formula (II) comprising step a) of the preparation process of the compounds of formula (I) is described hereinafter.

Another object of the present invention is a process for the preparation of formula (I) PFPEs comprising the following steps:

a) preparation of the compound of formula (II) by addition, under stirring, of the formula (III) peroxidic compound:

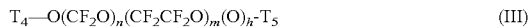

$$T_4\text{—}O(CF_2O)_n(CF_2CF_2O)_m(O)_h\text{-}T_5 \quad (III)$$

wherein $T_4$, $T_5$, equal to or different from each other, are selected from $CF_3$—, $CF_3CF_2$—, —COF, —$CF_2$COF, $XCF_2$—, $XCF_2CF_2$— wherein X=Cl, —OR''$_f$ wherein R''$_f$ is a $C_1$–$C_3$ perfluoroalkyl, having a n'/(n'+m') ratio from 0.05 to 0.25 and a h/(n'+m') ratio from 0.1 to 0.3 and a PO (peroxidic content) content, defined as grams of active oxygen/100 grams of compound, from 1.8 to 4, preferably from 2 to 3.8, to a reaction medium formed by a perfluoropolyether oil, contained in a reactor, maintained at a temperature in the range 150° C.–250° C., preferably 230–250° C., so as to have a PO of the reaction mixture between 0 and 0.5, preferably between 0 and 0.2, by continuously extracting the reaction mixture and heating the collected fractions not containing the starting perfluoropolyether oil at temperatures comprised between 220 and 250° C. until complete removal of the residual peroxidic groups, obtaining the compound of formula (II);

b) fluorination of compound (II) with the obtainment of compound of formula (I).

Alternatively step a) can be carried out by using as reaction medium, instead of the perfluoropolyether oil, the previously obtained compound of formula (II).

The peroxidic perfluoropolyethers of formula (III) are known compounds and can be prepared by oxypolymerization of tetrafluoroethylene at temperatures comprised between −100° C. and −40° C., in the presence of UV light and/or radical initiator. See for example U.S. Pat. No. 5,744,651.

In step a) the compound (III) is added to the preheated reaction medium, preferably with a flow-rate comprised between 0.1 and 1.3 kg/h per Kg of reaction medium.

The fluorination process of step b) is known and can be carried out with gaseous fluorine at temperatures comprised betwee 150 and 250° C. and/or photochemically at temperatures comprised between −40° C. and +200° C. See for example U.S. Pat. No. 4,664,766.

After step b) it is possible to subject compound (I) to molecular distillation to separate fractions having a different molecular weight useful for the various uses in lubrication. In this way fractions can be prepared having improved thermooxidative features with respect to the commercial fractions of Fomblin® Z.

As perfluoropolyether oils, to be used both in the preparation of the compounds of formula (I) and (II), the compounds of formula (A) marketed as Fomblin® Z, or other perfluoropolyether oils as for example Fomblin® Y, Krytox®, Demnum®, can for example be used.

Some Examples follow for illustrative but not limitative purposes of the present invention.

EXAMPLES

Characterization
  Kinematic viscosity
    The kinematic viscosity measurements have been carried out with Cannon-Fenske type viscometers previously calibrated at 20° C., 40° C. and at 100° C.
  Viscosity index
    The viscosity index determination is carried out by using the kinematic viscosity data at 40° C. and at 100° C. by applying the ASTM D 2270 method.
  Thermogravimetric analysis (TGA)
    The thermogravimetric analysis is carried out by using the DU PONT 951 instrument, putting about 20 mg of the sample in the platinum measurement cell and using a temperature gradient equal to 10° C./min in air atmosphere.
  Pour Point
    It has been determined according to the ASTM D 97-66 method.
  Number average molecular weight
    It has been determined by $^{19}F$ NMR analysis.
  Peroxidic content (PO) determination by iodometric titration
    The peroxidic content analysis of the perfluoropolyether oil is carried out according to the following procedure: a weighed amount of oil (some grams) is dissolved in about 20 ml of an halogenated solvent (CFC 113 or Galden® ZV 60), 1 ml of acetic acid and 30 ml of a sodium iodide solution at 5% in isopropyl alcohol are added. It is put under strong stirring for about 15 minutes and the iodine developed from the reaction with the peroxide is titrated with an aqueous solution of sodium thiosulphate having a known titre, by using a potentiometric titrator Mettler DL 40 equipped with platinum electrode and reference electrode. The content of peroxide PO is expressed in g of active oxygen (MW=16) for 100 g of oil.
  Thermooxidative stability
    As thermooxidative stability measure, both in the presence and in absence of metals, it is meant the temperature at which there is a loss of 50% by weight of the compound determined by thermogravimetric analysis.

Example 1

195 g of a perfluoropolyether of formula (A) wherein $R_f$, $R_f'$ are —$CF_3$, —$C_2F_5$, $ClCF_2$—, $ClCF_2CF_2$—, p/q equal to 0.75 and having number average molecular weight of 12,000 are introduced in a 500 ml round bottomed glass flask, equipped with stirring, dropping funnel, inlet for nitrogen and with a siphon for the gas and liquid outlet placed so that the level of the reactants in the flask is maintained constant.

It is put under stirring, and it is heated with an oil bath until reaching a temperature of 230° C.

172 grams/h of a peroxidic perfluoropolyether of formula:

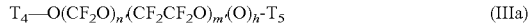

$$T_4-O(CF_2O)_{n'}(CF_2CF_2O)_{m'}(O)_h-T_5 \quad (IIIa)$$

wherein the end groups $T_4$, $T_5$ are $CF_3-$ (8%) and $CF_3CF_2-$ (92%), the number average molecular weight is equal to 9,060, with $h/(m'+n')=0.16$ such that the peroxidic content (PO) determined by iodometric analysis is equal to 2.3 g active oxygen/100 g of perfluoropolyether and the molar ratio $n'/(n'+m')=0.229$ with a content of ether units $CF_2O-$ equal to 0.204 moles/100 g of perfluoropolyether, are fed into the reactor for 10 hours, through the dropping funnel, contemporaneously fluxing nitrogen.

The collected compound in the first 6 hours is eliminated since it contains perfluoropolyether of formula (A).

In the following 4 hours, 554 grams are collected of substantially non peroxidic compound, which is subsequently heated in a stirred reactor, at 240° C. until the complete removal of the small amounts of residual PO.

537 g of compound having the following structure formula:

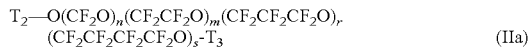

$$T_2-O(CF_2O)_n(CF_2CF_2O)_m(CF_2CF_2CF_2O)_r (CF_2CF_2CF_2CF_2O)_s-T_3 \quad (IIa)$$

are obtained, wherein the end groups $T_2$, $T_3$, equal to or different from each other, are $CF_3-$ (7% by moles), $CF_3CF_2-$ (86%), $CF_3CF_2CF_2-$ (3%), $CF_3CF_2CF_2CF_2-$ (3%), $-CF_2COF$ (1%); the number average molecular weight is equal to 6,950 and the molar ratios of the chain units are respectively: $m/n=2.23$; $n/(n+m+-r+s)=0.285$; $(r+s)/(m+n+r+s)=0.078$.

The compound is introduced in a photochemical reactor, equipped with a 150 W high pressure mercury lamp and subjected to fluorination at the temperature of 50° C. with a fluorine flow equal to 5 litres/h. After 11 hours the compound is discharged and by the analysis it results to be the compound of formula:

$$T-O(CF_2O)_n(CF_2CF_2O)_m(CF_2CF_2CF_2O)_r (CF_2CF_2CF_2CF_2O)_s-T_1 \quad (Ia)$$

wherein T and $T_1$, equal to or different from each other, are $CF_3-$ (10% by moles), $CF_3CF_2-$ (85%), $CF_3CF_2CF_2-$ (2.5%) and $CF_3CF_2 CF_2CF_2-$ (2.5%) having a number average molecular weight equal to 6,930 and with molar ratios of the chain units respectively equal to $m/n=2.23$; $n/(n+m+r+s)=0.285$; $(r+s)/(m+n+r+s)=0.078$.

The so obtained compound is subjected to molecular distillation under vacuum at 280° C. obtaining two fractions: a distillate of 182 g equal to 34% and a residue of 354 g equal to 66%. The residue of formula (Ia) has a number average molecular weight of 11,600 and results to have a viscosity of 229 cSt at 20° C., a pour point of −60° C. and a viscosity index (V.I.) equal to 295.

The characteristics of said residue as viscosity at 20° C. are of the same order of magnitude of Fomblin Z 25.

Example 2

In a 500 ml round bottomed glass flask, equipped with stirring, dropping funnel, inlet for nitrogen and a siphon for the gas and liquid outlet placed so that the level of the reactants in the flask is maintained constant, 160 g of a perfluoropolyether of formula:

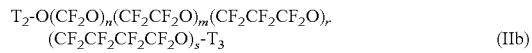

$$T_2-O(CF_2O)_n(CF_2CF_2O)_m(CF_2CF_2CF_2O)_r (CF_2CF_2CF_2CF_2O)_s-T_3 \quad (IIb)$$

are introduced, wherein $T_2$, $T_3$, equal to or different from each other, are $CF_3-$ (8% by moles), $CF_3CF_2-$ (87%), $CF_3CF_2CF_2-$ (2%), $CF_3CF_2CF_2CF_2-$ (2.5%), $-CF_2COF$ (0.5%), having a number average molecular weight 7,000, wherein the molar ratios of the chain units are respectively: $m/n=2.51$; $n/(n+m+r+s)=0.261$; $(r+s)/(m+n+r+s)=0.075$.

It is subjected to stirring and heated with oil bath until reaching a temperature of 230° C.

Then 198 grams/h of a peroxidic perfluoropolyether of formula:

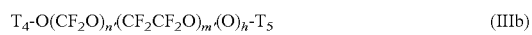

$$T_4-O(CF_2O)_{n'}(CF_2CF_2O)_{m'}(O)_h-T_5 \quad (IIIb)$$

wherein the end groups $T_4$, $T_5$ are $CF_3-$ (6% by moles) and $CF_3CF_2-$ (94%), the number average molecular weight is equal to 9,700, with $h/(n'+m')=0.185$ such that the peroxidic content (PO) is equal to 2.7 g active oxygen/100 g of perfluoropolyether and the molar ratio $n'/(n'+m')=0.198$ with a content of ether units $-CF_2O-$ equal to 0.172 moles/100 g of perfluoropolyether, are fed into the reactor for 6 hours, through the dropping funnel under nitrogen flow.

In six hours 840 grams are collected of substantially non peroxidic compound which is subsequently heated in a stirred reactor, at 240° C. until complete removal of the small amounts of residual PO.

814 g of compound having the following structure formula:

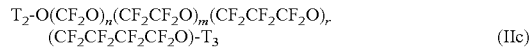

$$T_2-O(CF_2O)_n(CF_2CF_2O)_m(CF_2CF_2CF_2O)_r (CF_2CF_2CF_2CF_2O)-T_3 \quad (IIc)$$

are obtained, wherein the end groups $T_2$, $T_3$, equal to or different from each other are $CF_3-$ (8%), $CF_3CF_2-$ (87%), $CF_3CF_2CF_2-(2\%)$ and $CF_3CF_2CF_2CF_2-$ (2.5%), $-CF_2COF$ (0.5%); the number average molecular weight is equal to 7,000 and wherein the molar ratios of the chain units are respectively: $m/n=2.51$; $n/(n+m+r+s)=0.261$; $(r+s)/(m+n+r+s)=0.075$.

Example 3

With the same modalities of the Example 1, 250 g of formula (A) perfluoropolyether of the Example 1 are charged in the reactor, it is heated at 230° C. Successively 115 g/h of the peroxidic perfluoropolyether of the Example 2 are fed for 14 hours.

The compound collected in the first 10 hours is eliminated since it contains the formula (A) perfluoropolyether.

In the following 4 hours, 345 grams of non peroxidic compound are collected, having the following formula:

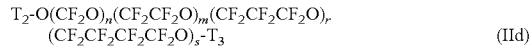

$$T_2-O(CF_2O)_n(CF_2CF_2O)_m(CF_2CF_2CF_2O)_r (CF_2CF_2CF_2CF_2O)_s-T_3 \quad (IId)$$

wherein the end groups $T_2$, $T_3$, equal to or different from each other, are $CF_3-$ (6%), $CF_3CF_2-$ (84%), $CF_3CF_2CF_2-$ (4%), $CF_3CF_2CF_2CF_2-$ (5%), $-CF_2COF$ (1%); the number average molecular weight is equal to 6,350, the molar ratios between the chain units are respectively $m/n=2.44$; $n/(n+m+r+s)=0.266$; $(r+s)-/(m+n+r+s)=0.086$.

Example 4

The compound obtained in the Example 1 having molecular weight equal to 11,600 after addition of 2% by weight of alumina ($Al_2O_3$) is subjected to thermogravimetric analysis (TGA). The alumina is usually employed as reactant to simulate the perfluoropolyether oil stability in the presence of metals as a function of temperature.

The thermogravimetric analysis gives a value of $T_{1/2}$, i.e. the temperature at which there is a loss of 50% by weight of the compound, equal to 295° C.

Example 5 (Comparative)

The TGA analysis is carried out on a commercial Fomblin® Z 25 having a viscosity of 245 cSt at 20° C. and formula:

$$R_fO(C_2F_4O)_p(CF_2O)_qR_f'$$ (A1)

wherein the end groups $R_f$, $R_f'$, equal to or different from each other, are $CF_3$— (49% by moles), $CF_3CF_2$— (6%), $ClCF_2$-(28%), $ClCF_2CF_2$— (17%); the p/q ratio is equal to 0.64. The content of ether units —$CF_2O$— is equal to 0.672 moles/100 g of polymer.

The oil is additioned with 2% of alumina and subjected to TGA analysis, as in the Example 4, obtaining a value of $T_{1/2}$=260° C.

By comparing the results of the TGAs it follows that the perfluoropolyether oil of the Example 1 characterized in the Example 4 results to have an increase of thermooxidative stability of 35° C. in comparison with formula (A) commercial perfluoropolyether oils.

Example 6

The compound obtained in the Example 1 having molecular weight equal to 11,600, after addition of 2% by weight of alumina and 1% by weight of stabilizer bis-dipropylamine perfluoropolyether having the following structure:

$$(CH_3CH_2CH_2)_2N—CH_2CF_2O(CF_2CF_2O)_a(CF_2O)_b$$
$$CF_2CH_2N(CH_2CH_2CH_3)_2$$

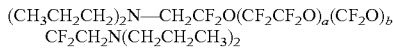

and a number average molecular weight of 2,000 and wherein the a/b ratio=0.67 is subjected to TGA analysis under the same conditions of the Example 4 obtaining a $T_{1/2}$ value equal to 324° C.

Example 7 (Comparative)

The commercial Fomblin® Z 25 used in the Example 5 (comparative) is charged with 2% of alumina and with 1% of the stabilizer used in the Example 6.

The mixture is subjected to TGA under the same conditions of the Example 4 obtaining a $T_{112}$ value equal to 297° C.

The perfluoropolyether oil of formula (I) of the present invention, additioned with a stabilizer, results to have an increase of thermooxidative stability of 27° C. in comparison with the commercial perfluoropolyether oils of formula (A) additioned with the same stabilizer.

Example 8

5.07 g of compound obtained in the Example 1 having molecular weight equal to 11,600 are charged with 107 mg of alumina (2% by weight on the polymer) and heated at 200° C. for 24 hours.

At the end of the thermal treatment the perfluoropolyether results to have an average molecular weight equal to 10,300 (reduction of 11% with respect to the initial molecular weight) and a weight loss equal to 4.9%.

Repeating the test but using Fomblin® Z 25 of the Example 5 (comparative) it is noticed the complete degradation of the commercial perfluoropolyether (loss in weight=98%).

Example 9

The compound obtained in the Example 1 having molecular weight equal to 11,600 is subjected to thermogravimetric analysis (TGA) in absence of metals.

The thermogravimetric analysis carried out in the presence of $N_2$ and air gives a $T_{1/2}$ value respectively of 434° C. and 433° C.

Example 10

The distillate obtained by molecular distillation in the Example 1 (182 g) was analyzed by NMR, thus showing the following formula:

$$T-O(CF_2O)_n(CF_2CF_2O)_m(CF_2CF_2CF_2O)_r$$
$$(CF_2CF_2CF_2CF_2O)_s-T_1$$ (Ib)

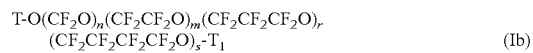

wherein T and $T_1$, equal to or different from each other, are $CF_3$— (7.5% by moles), $CF_3CF_2$— (86%), $CF_3CF_2CF_2$— (3%) and $CF_3CF_2$—$CF_2CF_2$— (3.5%), the number average molecular weight is equal to 3,960 and the molar ratios of the chain units are respectively equal to m/n=2.34; n/(n+m+r+s)=0.276; (r+s)/(m+n+r+s)=0.079.

The viscosity at 20° C. of said distillate is 31.5 cSt.

The compound after addition of 2% by weight of alumina ($Al_2O_3$) is subjected to thermogravimetric analysis (TGA) giving a $T_{1/2}$ value of 300° C.

Example 11 (Comparative)

With the same modalities of the Example 3, 250 g of formula (A) perfluoropolyether of the Example 1 are charged into the reactor which is heated at 230° C. Successively 115 g/h of a peroxidic perfluoropolyether having the following formula:

$$T_4-O(CF_2O)_{n'}(CF_2CF_2O)_{m'}(O)_{h'}-T_5$$

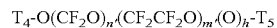

wherein the end groups $T_4$, $T_5$ are $CF_3$— (10%) and $CF_3CF_2$— (90%), the number average molecular weight is equal to 5,500, with h/(m'+n')=0.15 such that the peroxidic content (PO) is equal to 2.4 but having a molar ratio n'/(n'+m')=0.379 and a content of ether units —$CF_2O$— equal to 0.381 moles/100 g of perfluoropolyether, are fed into the reactor through the dropping funnel for 14 hours, contemporaneously fluxing nitrogen.

The compound collected in the first 10 hours is eliminated since it contains the perfluoropolyether of formula (A) previously charged in the flask.

In the following 4 hours, 320 grams of substantially non peroxidic compound are collected and subsequently heated in a stirred reactor, at 240° C. until the complete removal of the small amounts of residual PO. 315 g of compound having the following structure formula:

$$T_2-O(CF_2O)_n(CF_2CF_2O)_m(CF_2CF_2CF_2O)_r$$
$$(CF_2CF_2CF_2CF_2O)_s-T_3$$

are obtained, wherein the end groups $T_2$, $T_3$, equal to or different from each other, are $CF_3$— (9% by moles), $CF_3CF_2$— (86%), $CF_3CF_2CF_2$— (2%), $CF_3CF_2CF_2CF_2$— (2%), —$CF_2COF$ (1%); the number average molecular weight is equal to 3,850 and the molar ratios of the chain units are respectively: m/n=0.85; n/(n+m+-r+s)=0.501; (r+s)/(m+n+r+s)=0.067.

The compound is then introduced in a photochemical reactor, equipped with a 150 W high pressure mercury lamp and subjected to fluorination at the temperature of 50° C. with a fluorine flow equal to 5 litres/h. After 11 hours the compound is discharged and by the analysis it results to be the compound of formula:

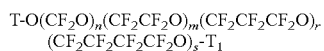

wherein T and $T_1$, equal to or different from each other, are $CF_3$— (10% by moles), $CF_3CF_2$— (86%), $CF_3CF_2CF_2$— (2%) and $CF_3CF_2CF_2$—$CF_2$— (2%), having a number average molecular weight equal to 3,840, a viscosity at 20° C. of 30 cSt, and molar ratios of the chain units respectively equal to m/n=0.85; n/(n+m+r+s)=0.504; (r+s)/(m+n+r+s)=0.068.

The so obtained compound contains the same chain units of compound of formula (Ib) of the Example 10 and has comparable molecular weight and viscosity but the molar ratios m/n and n/(n+m+r+s) are outside the ranges of formula (I) compounds of the present invention.

Example 12 (Comparative)

The compound of the the Example 11 (comparative) having a number average molecular weight equal to 3,840 and a viscosity of 30 cSt at 20° C., after addition of 2% by weight of alumina ($Al_2O_3$), is subjected to thermogravimetric analysis (TGA). A value of $T_{1/2}$ equal to 268° C. is obtained.

The comparison of this $T_{1/2}$ (268° C.) with the $T_{1/2}$ of the compound of example 10 (300° C.) shows that linear perfluoropolyethers containing —$CF_2O$—, —$CF_2CF_2O$—, —$CF_2CF_2CF_2O$—, —$CF_2CF_2CF_2CF_2O$— units but having at least one of the molar ratios m/n, n/(n+m+r+s), (r+s)/(m+n+r+s) outside the ranges of formula (I) compounds of the present invention, have a thermooxidative stability, in the presence of metals, lower than that of the linear perfluoropolyethers of the present invention having similar viscosity.

The invention claimed is:

1. A process for lubricating in the presence of metals, comprising the step of applying linear perfluoropolyethers as lubricants, where said linear perfluoropolyethers have the following structural formula:

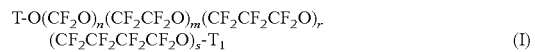 (I)

wherein:
T and $T_1$ are the same or different, and are each selected from the group consisting of $CF_{3\text{-}}$, $CF_3CF_{2\text{-}}$, $C_3F_{7\text{-}}$, $C_4F_{9\text{-}}$, $ClCF_{2\text{-}}$, or $ClCF_2CF_{2\text{-}}$;

n, m, r, s are integers such that the number average molecular weight is comprised between 700 and 100,000:

the m/n ratio is comprised between 2 and 20;

the (r+s)/(n+m+r+s) ratio is comprised between 0.05 and 0.2;

the n/(n+m+r+s) ratio ranges from 0.05 to 0.40; and wherein the perfluorooxyalkylene units are statistically distributed along the polymeric chain.

2. A process for conferring water- and oil-repellance to surfaces, comprising the step of applying linear perfluoropolyethers to said surfaces, where said linear perfluoropolyethers have the following structural formula:

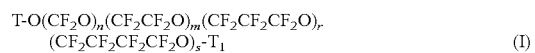 (I)

wherein:
end groups T and $T_1$ are the same or different, and are each selected from the group consisting of $CF_{3\text{-}}$, $CF_3CF_{2\text{-}}$, $C_3F_{7\text{-}}$, $C_4F_{9\text{-}}$, $ClCF_{2\text{-}}$, $ClCF_2CF_{2\text{-}}$ or -$(CFz)z$ COF, wherein z=0, 1, 2 or 3;

n, m, r, s are integers such that the number average molecular weight is comprised between 700 and 100,000;

the m/n ratio is comprised between 2 and 20;

the (r+s)/(n+m+r+s) ratio is comprised between 0.05 and 0.2;

the n/(n+m+r+s) ratio ranges from 0.05 to 0.40;

wherein the perfluorooxyalkylene units are statistically distributed alona the polymeric chain, and wherein the total moles of the end groups have from 0.5% by moles to 50% by moles of -COF groups.

* * * * *